UNITED STATES PATENT OFFICE.

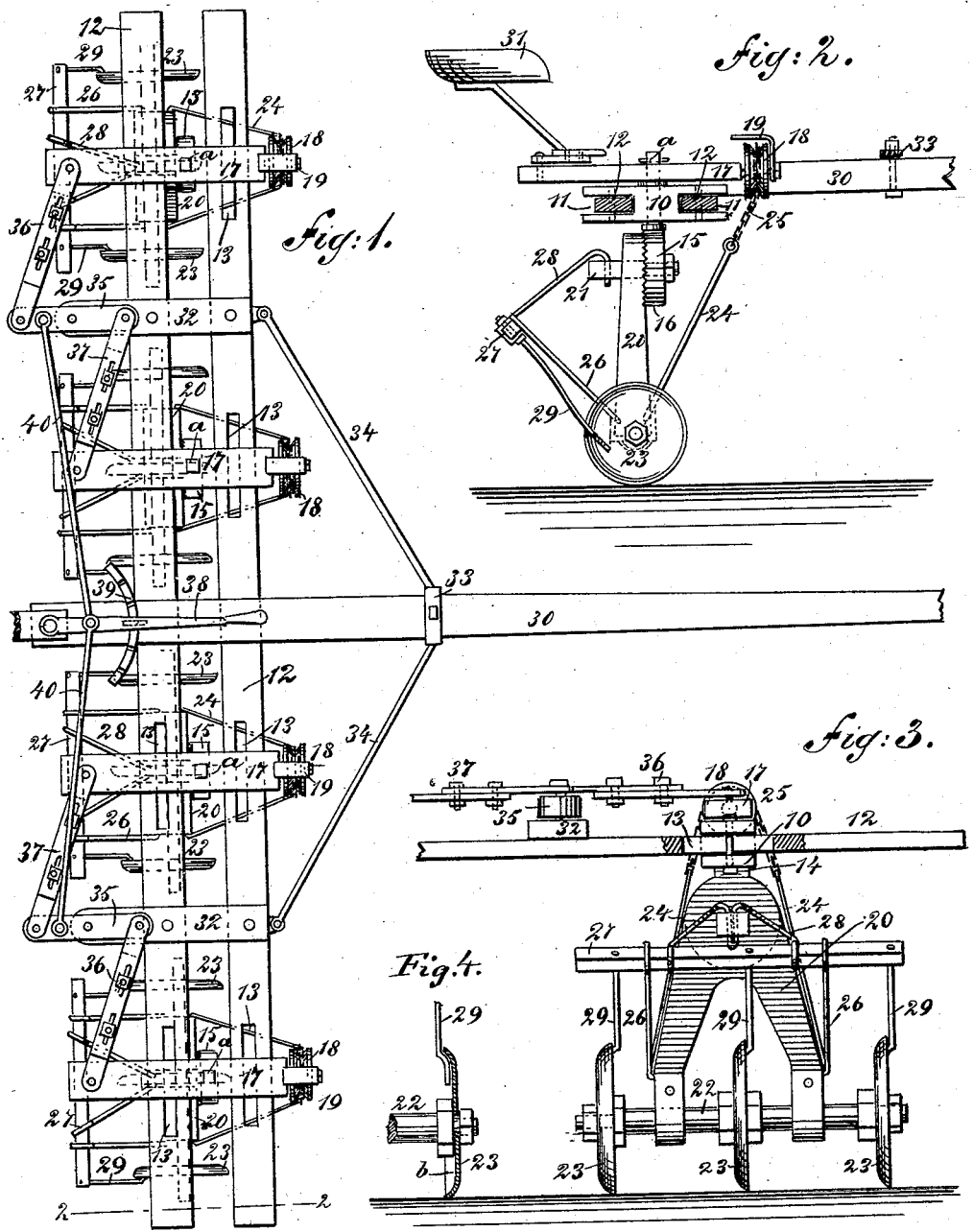

EDWARD W. FREIBURGHOUSE, OF SABETHA, KANSAS, ASSIGNOR TO HIMSELF AND EPHRAIM KEIM, OF SAME PLACE.

CULTIVATOR.

SPECIFICATION forming part of Letters Patent No. 455,709, dated July 7, 1891.

Application filed April 9, 1891. Serial No. 388,273. (No model.)

*To all whom it may concern:*

Be it known that I, EDWARD W. FREIBURGHOUSE, of Sabetha, in the county of Nemaha, and State of Kansas, have invented a new and useful Improvement in Cultivators, of which the following is a full, clear, and exact description.

My invention relates to an improved cultivator, and has for its object to provide an implement capable of effective work either upon level ground, a hillside, or for cultivating side ridges, as in listed corn.

A further object of the invention is to provide a means whereby the cultivator-blades may be conveniently and expeditiously adjusted laterally to throw the dirt away from or toward the plants and adjusted vertically to stand at any desired angle to the ground.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a transverse section taken practically on the line 2 2 of Fig. 1. Fig. 3 is a rear elevation, partly in section, of one end of the implement; and Fig. 4 is a detail sectional view of one of the disks and the scraping-arm acting in conjunction therewith.

The frame of the implement consists of a series of transverse blocks 10, having horizontal recesses 11 produced in their ends, and longitudinal beams 12 passing through the recessed ends of the blocks, an adjustable connection being effected between the blocks and beams of the frame by producing in the beams longitudinal slots 13 and passing bolts 14 up through the recessed ends of the blocks and the slots of the beams, as illustrated in Fig. 3. Ordinarily four blocks 10 are employed in the construction of the frame, arranged at suitable intervals apart, and in each of the blocks the shank $a$ of a disk 15 is journaled, the disks being located beneath the blocks and the shanks extending some distance above them. The upper extremities of the shanks $a$ are polygonal in cross-section. One or both faces, preferably one face, of the disks 15 is provided with radial teeth 16, as best shown in Fig. 2, and each disk is provided with a central aperture. The upper end of each disk-shank passes through a bar 17 at or near the center of said bar, and the bars are located directly over the blocks 10 and extend forward and rearward beyond the sides of the frame. At the forward end of each block a friction-roller 18 is journaled the upper surface of the rollers being preferably protected by a shield 19.

In connection with each of the disks 15 a hanger 20 is employed. The hangers are shaped, essentially, as an inverted V, and their upper ends are preferably semicircular, or practically so. One or both faces, preferably one face, of the curved ends of the hangers is provided with teeth adapted to engage with one of the toothed surfaces of the disks 15. The attachment between the disks and the hangers is effected, preferably, by passing bolts 21 through the toothed portions thereof, which bolts are provided with suitable nuts. Thus by loosening and tightening the nuts upon the bolts 21 the hangers may be carried upward at their upper ends to a greater or less extent, as may be desired, or the hangers may be held at a right angle to the frame and locked in either of these positions.

In the lower ends of the members of the hangers boxes of any approved construction are located, and in the boxes shafts 22 are journaled. The boxes, however, are preferably so made that the shafts 22 may be reversed. The shafts extend some distance beyond the sides of the hangers, and each shaft has secured thereon, preferably, three disk-cutters 23, which cutters are dished upon one face, as illustrated at $b$ in Fig. 4. The cutters are ordinarily so located that one is near each extremity of the shaft and the other between the members of the hanger in which the shaft is journaled.

In order that the hangers may be braced at all times, even when adjusted or being adjusted, links 24 are secured to the lower portions of the hangers, the links of each hanger being connected to the ends of a chain 25, and the said chains travel over the friction or guide pulleys 18, the shields 19 serving to prevent the chains from leaving the pulleys.

Brace-rods 26 are projected outward and upward from the rear sides of the hangers, which brace-rods serve to support a horizontal bar 27 at the rear of each hanger, and the bars are further braced and supported by brackets 28, attached thereto and to the head portions of the bolts 21. The bars 27 serve to support a series of scrapers 29, which extend downward in front of the dished face of each disk cutter, and the lower extremities of the cutters are curved inward to conform to the inner peripheral surface-contour of the cutters, as is best illustrated in Fig. 4.

At the center of the frame the inner end of a pole or tongue 30 is secured in any suitable or approved manner, upon which a spring-supported seat 31 is located, and between the movable bars 17 at each side of the tongue metal straps 32 are located, which are firmly attached to the upper face of the frame and extend some distance rearward, as illustrated in Fig. 1. The tongue or pole 30 is preferably braced by securing thereto a collar 33 and connecting the collar to the front edge of the frame by rods 34 or their equivalents.

Upon the rear end of each strap 32 a horizontal lever 35 is centrally pivoted, and the rear ends of the movable bars 17 are connected one to the rear and the other to the forward end of the lever 35, as illustrated in Fig. 1, by means of sectional extensible connecting-rods 36 and 37.

A single lever 38 is fulcrumed upon the tongue near the driver's seat, engaging with a suitable rack 39, and the said lever is connected to the levers 35 by means of links 40, the connection being effected between the pivotal point of the levers 35 and their rear ends, as is likewise best shown in Fig. 1. By moving the lever 38 to the right or to the left the shafts at each side of the pole are carried at an angle in opposite directions to such an extent that the two shafts at each side of the center of the implement will form virtually the legs of the letter V, and if the apex of the angle thus formed is at the front of the implement the disk cutters will throw the earth in the direction of the plants. If, however, the apex of the angle is in the direction of the rear, the earth will be thrown away from the plants.

When the ground to be cultivated is level, the hangers are placed in a perpendicular position and secured. When, however, it is desired to cultivate listed corn and loosen the dirt forming the ridges, the hangers are so adjusted that one shaft will be given an upward inclination in the direction of the center of the implement and the next shaft a similar inclination, but in the direction of the outer end of the implement. Thus the cutters stand at an angle representing the legs of the letter A and travel along the ridge virtually from top to bottom thereof.

When a hillside is to be cultivated, all of the shafts may be given an inclination sufficient to cause the cutters to engage with the ground, while the frame may be virtually in a horizontal position. The hangers may be carried in the direction of one another or away from one another to increase the distance between the inner cutters, which is accomplished by adjusting the blocks 10 upon the longitudinal beams 12.

By making all the shafts 22 alike, and also the boxes in which they are journaled, the shafts may be reversed, so as to make the dished surfaces of the cutters face to or from the plants.

Having thus described my invention, I claim as new and desire to secure by Letters Patent—

1. In a cultivator, the combination, with a frame, disks provided with shanks pivoted in the frame, and the said disks being provided with toothed faces, of hangers having toothed faces engaging with the similar faces of the disks, locking devices uniting the hangers and disks, shafts journaled in the lower ends of the hangers, disk cutters attached to the shafts, and levers connected with the disk-shanks, substantially as shown and described, whereby the hangers may be carried diagonally beneath the frame or elevated to a position at a greater or less angle to the ground, as and for the purpose specified.

2. In a cultivator, the combination, with a frame, disks provided with toothed faces and having shanks journaled in the frame, arms connected to the upper ends of the disk-shanks and provided with guide-rollers at one of their ends, and levers connected to said arms, whereby the disks may be revolved, of hangers provided with toothed surfaces engaging with the similar surfaces of the disks, locking devices uniting the hangers and the disks, chains passed over the guide-rollers and connected with the hangers, shafts journaled in the hangers, and disk cutters secured to the shafts, the said cutters being provided with a dished face, as and for the purpose specified.

3. In a cultivator, the combination, with a frame, disks provided with toothed faces and having shanks journaled in the frame, arms connected to the upper ends of the disk-shanks and provided with guide-rollers at one of their ends, and levers connected to the said arms, whereby the disks may be revolved, of hangers provided with toothed surfaces engaging with the similar surfaces of the disks, locking devices uniting the hangers and the disks, chains passed over the guide-rollers and connected with the hangers, shafts journaled in the hangers, disk cutters secured to the shafts, the said cutters being provided with a dished face, and scrapers supported from the hangers and extending downward nearly to an engagement with the peripheries of the cutters at their dished faces, as and for the purpose specified.

4. In a cultivator, the combination, with a frame comprising longitudinal beams and transverse blocks adjustable upon said beams, disks provided with toothed surfaces and shanks journaled in the blocks, horizontal arms attached to the upper ends of the disk-shanks, a lever pivoted between each two arms, extensible connecting-rods uniting the arms to the levers, a shifting-lever, and a link connection between the shifting-lever and the levers connected with the arms, of hangers having toothed surfaces at their upper ends engaging with the like surfaces of the disks, locking devices securing the hangers to the disks, shafts journaled in the lower ends of the hangers, disk cutters secured to said shafts, movable brace connections between the hangers and the horizontal arms connected to the toothed disks, and means, substantially as described, for cleaning the disk cutters, as and for the purpose specified.

EDWARD W. FREIBURGHOUSE.

Witnesses:
ROBT. BRESSEM,
ROY KESSELTINE.